C. H. T. ALSTON & P. T. HOUSTON.
INTERNAL COMBUSTION ENGINE.
APPLICATION FILED SEPT. 14, 1912.
1,068,379.
Patented July 22, 1913.
2 SHEETS—SHEET 1.
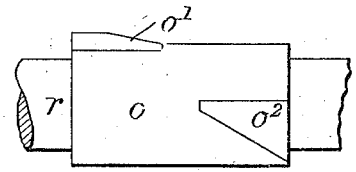
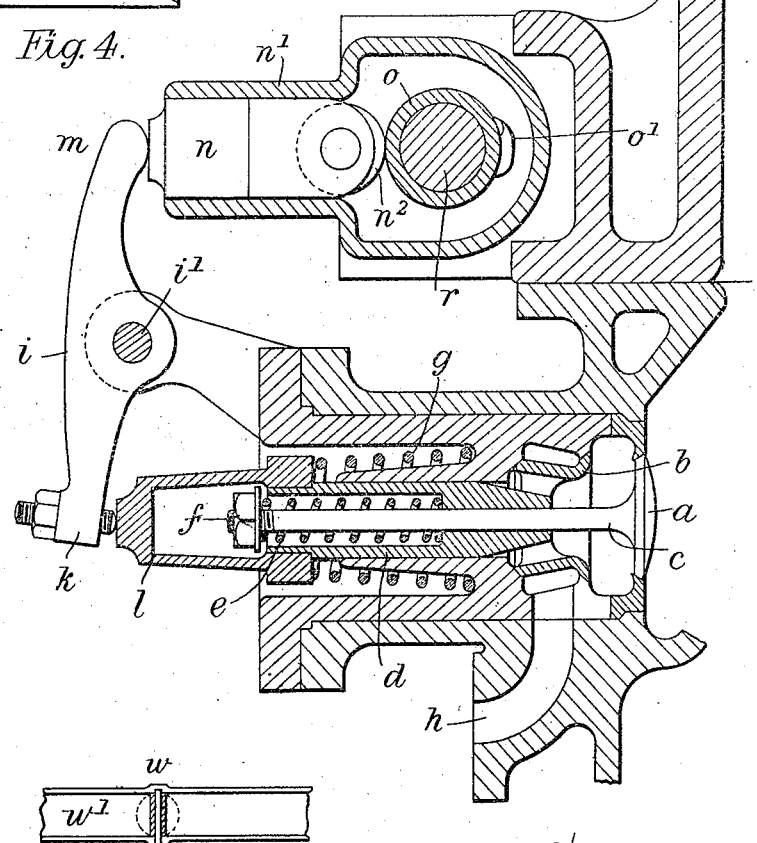
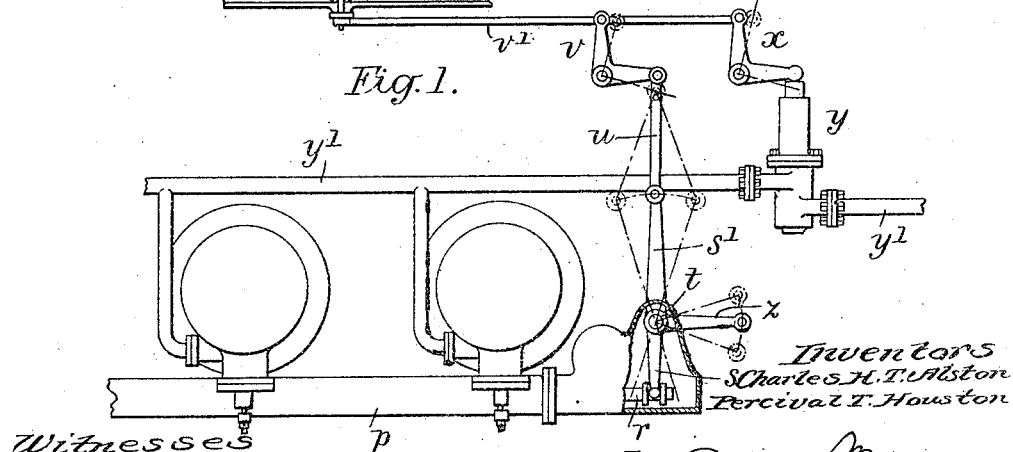

C. H. T. ALSTON & P. T. HOUSTON.
INTERNAL COMBUSTION ENGINE.
APPLICATION FILED SEPT. 14, 1912.
1,068,379.
Patented July 22, 1913.
2 SHEETS—SHEET 2.
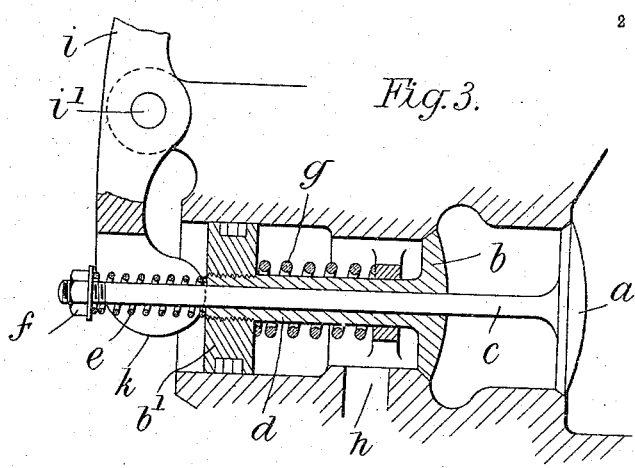
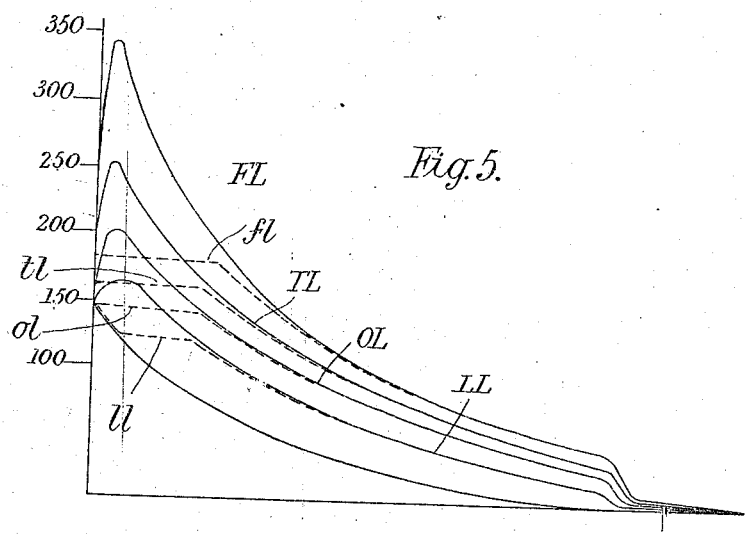
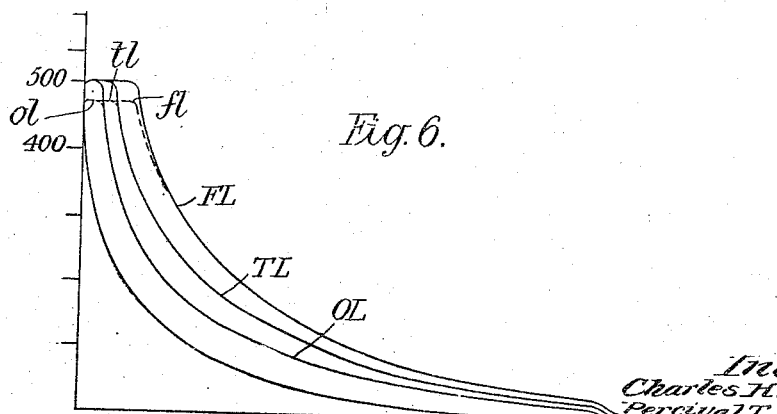
Inventors
Charles H. T. Alston
Percival T. Houston

UNITED STATES PATENT OFFICE.

CHARLES HENRY THOMAS ALSTON AND PERCIVAL TURNER HOUSTON, OF LONDON, ENGLAND.

INTERNAL-COMBUSTION ENGINE.

1,068,379.

Specification of Letters Patent.

Patented July 22, 1913.

Application filed September 14, 1912. Serial No. 720,426.

*To all whom it may concern:*

Be it known that we, CHARLES HENRY THOMAS ALSTON, of 19 Audley House, Margaret street, London, England, and PERCI-VAL TURNER HOUSTON, of 4 Lloyds avenue, London, England, subjects of the King of Great Britain, have invented certain new and useful Improvements Relating to Internal-Combustion Engines, of which the following is a specification.

This invention relates to internal combustin engines, whether working on the two-cycle or four-cycle system, and especially to those used for marine propulsion. When a ship is in a heavy sea, the propeller sometimes rises out of the water, thereby causing the engine to race. It is necessary, therefore, to throttle or otherwise control the engine at such times, and there follows then a danger that the engine may stop when the propeller reënters the water.

This invention has for its object the preventing of such an accidental stoppage of the engine.

It has been previously proposed to provide internal combustion engines with a supply of compresed air, the pressure of which is slightly below the normal pressure in the cylinder following ignition, for the purpose of starting the engine and as the motive fluid should a misfire occur. In the latter case a mechanically operated valve is timed to open and close during the power stroke and a non-return valve is held closed against the air pressure by the normal pressure in the cylinder following ignition, so that the air is prevented from entering the cylinder unless the ignition fails. The objection to this device is that when the amount of fuel introduced is below the normal full charge (say for a light load) the pressure of the air will exceed the internal pressure of the cylinder and will therefore gain admission; and if the pressure of the air is below the lowest internal pressure used, then the pressure will be insufficient to operate as the motive fluid should the engine be running with full load. Again, in the case of the "Diesel" type of engine, the admission period of the compressed air for full load would be too great for half load, and if the period was shortened to the lightest load then the amount of compressed air entering the cylinder should a misfire occur would be insufficient to operate as the motive fluid at full load.

According to this invention the timing of the mechanically operated valve, the duration of its opening, and the pressure of the compressed air are so arranged that normally the pressure in the cylinder following ignition is sufficient at all loads to prevent the entry of the compressed air to the cylinder. When a misfire occurs, due to throttling or other cause, or a momentary falter of the engine takes place due to the reimmersion of the propeller, causing a momentary over-load, the compressed air will be able to gain admission and prevent or practically prevent a stoppage of the engine. The air is, or may be admitted on the firing stroke from a suitable receiver, and the ignition is timed to take place before the compressed air valves are timed to open.

In some cases the valves referred to above may serve as the starting and reversing valves, and in engines of the "Diesel" type in which the maximum pressure varies little or not at all, it is sufficient to vary the cut-off of the compressed air only according to the load, keeping the air pressure approximately constant and rather lower than compression pressure.

By arranging the cut-off of the compressed air to take place earlier with the less amount of fuel, and vice versa, the liability of the compressed air gaining admission to the cylinder toward the end of the admission period of the air (owing to the falling pressure in the cylinder due to the expansion) is avoided; and for this reason also the pressure of the compressed air for different loads is arranged to be under control simultaneously, and would be higher with a late cut-off than with an early cut-off.

In the accompanying drawings Figure 1 is a diagram illustrating the controlling mechanism. Fig. 2 is a section of a combined automatic inlet valve and mechanically operated valve, Fig. 3 is a modification thereof and Fig. 4 is an elevation of a cam cylinder for actuating the mechanical valve. Figs. 5 and 6 are diagrams respectively for a constant volume cycle and a constant pressure cycle (Diesel type).

Referring first to Figs. 2 and 3, $a$ is the automatic inlet valve and $b$ is the mechanically operated valve, the latter being preferably of the equilibrium type. The stem c of the valve a passes through and is free to slide in the stem d of the valve b, a light coil spring e being mounted on the stem c and acting between the nut f and the valve stem d as in Fig. 2, or the piston end b' of the valve b as in Fig. 3 in order to hold the valve a closed. A stronger spring g is arranged around the stem d and serves to hold the valve b closed unless mechanically operated. h is the inlet for compressed air which is supplied from any suitable source or reservoir. i is a tappet lever pivoted at i', one end k of which lever rests against an extension piece l of the valve stem d as in Fig. 2 or against the piston end b' of the valve b itself as in Fig. 3. The other end m of the tappet lever rests against a plunger n capable of sliding in its casing n', the plunger carrying a roller or wheel $n^2$ which runs upon the surface of the cam cylinder o when the latter is in its neutral position and is actuated by the cams o' or $o^2$ when the cam cylinder is moved longitudinally to bring either of the cams into the path of the roller or wheel $n^2$. The cams are of taper shape, such as shown in Fig. 4, in order to enable the supply of compressed air to be variably opened and cut off at suitable parts of the stroke of the engine.

The valve mechanism works as follows:—When the engine is running normally the pressure in the cylinder is sufficient to hold the valve a closed; although the valve b is opened to admit compressed air at every cycle, the pressure of the air is regulated so that it is always lower than the pressure prevailing in the cylinder up to the point of cut off of the air and therefore the air can not gain admission to the cylinder. Similarly, the cut-off of the compressed air is arranged to prevent the admission of compressed air to the cylinder when the internal pressure falls (owing to the expansion of the gases) below that of the compressed air. Should a misfire occur, or if for any reason the internal pressure in the cylinder should prove insufficient to hold closed the valve a when the air valve b is opened, then compressed air would flow into the cylinder and become the motive power to complete the stroke and insure the running of the engine until the next firing stroke.

A suitable controlling mechanism is shown diagrammatically in Fig. 1. In a suitable casing p a cam shaft r is mounted to rotate and slide in suitable bearings and is rotated by suitable gearing, the cam shaft carrying the cam cylinders o, one for each cylinder. The end of the shaft r is connected to an arm s fixed on a shaft t and another arm s' fixed on the shaft t is connected by a link u to a bell-crank lever v which is connected by a link v' to the throttle valve (or fuel regulating device) w in the fuel supply pipe w'. The lever v is also linked to a similar lever x which is adapted to regulate a pressure reducing valve y in the compressed air supply pipe y'. The shaft t is rocked by any suitable means by hand, power, with or without the agency of a governor, or directly by such governor, an operating arm z being shown fixed to the shaft t. In the drawing the cam shaft is shown in the neutral or stop position with the fuel supply throttled or shut off at w. Upon the cam shaft being slid to the right or left, according to the direction of rotation desired (ahead or astern) the cams o' or $o^2$ are brought into the path of the roller or wheel $n^2$ as before described and the engine is started by admitting compressed air as is already known.

The fuel valve w and pressure reducing valve y being actuated by their connections with the cam shaft r, it follows that as the load varies so will the amount of fuel and the pressure of the compressed air be increased or reduced in proportion, the duration of admission of the air supply being lengthened or shortened correspondingly by the position of the cams with regard to the air valve tappet plunger n. In Fig. 5 a set of diagrams for an explosion type of engine indicating full load F, L, two thirds load T, L, one third load O, L, and light load L L, are given in full lines, the dotted lines f l, t l, o l and l l indicating the corresponding diagrams for the compressed air. In Fig. 6 a set of diagrams for a Diesel type of engine indicating full load F L, two-thirds load T L, and one-third load O L, in full lines for the fuel and corresponding diagrams for the compressed air f l, t l and o l. In the example illustrated in Fig. 5, the pressure of the compressed air is shown to vary according to the different internal pressures and the supply of compressed air is cut-off before the internal pressure falls to that of the compressed air, whereas in the example illustrated in Fig. 6 the pressure of the compressed air does not vary because the internal pressure remains approximately constant but the supply of compressed air is cut off before the internal pressure falls to that of the compressed air. Hence it follows that during normal working no compressed air will be able to gain admission to the cylinder except that small quantity which becomes trapped in the clearances between the valves a and b.

We claim:—

1. In an internal combustion engine, a working cylinder, a pipe for supplying compressed air to said cylinder, a mechanically operated valve controlling the compressed air supply, a non-return valve arranged to be acted on by the air admitted by said mechanically operated valve and held closed by the normal internal pressure in the cylinder following ignition, cut off mechanism controlling the opening and closing of said mechanically operated valve, a pressure reducing valve in the air supply pipe, a fuel supply pipe for said cylinder, a fuel regulating valve in said fuel supply pipe, connections between said pressure reducing valve and said fuel regulating valve, to correlate the action of the former and the latter, the cut off mechanism being operable to vary the duration of the opening of said mechanically operated valve, and connections between said cut off mechanism and said first-named connections to correlate the action of said cut off mechanism with relation to the fuel regulating valve and the pressure reducing valve, as and for the purpose set forth.

2. In an internal combustion engine, a working cylinder, a pipe for supplying compressed air to said cylinder, a mechanically operated valve controlling the compressed air supply, a non-return valve arranged to be acted on by the air admitted by said mechanically operated valve and held closed by the normal internal pressure in the cylinder following ignition, cut off mechanism controlling the opening and closing of said mechanically operated valve and including a slidably adjustable cam cylinder having tapered cams thereon to determine the duration of the opening of said mechanically operated valve, a pressure reducing valve in the air supply pipe, a fuel supply pipe for said cylinder, a fuel regulating valve in said fuel supply pipe, connections between said pressure reducing valve and said fuel regulating valve, to correlate the action of the former and the latter, the cut off mechanism being operable to vary the duration of the opening of said mechanically operated valve, and connections between said cut off mechanism and said first named connections to correlate the action of said cut off mechanism with relation to the fuel regulating valve and the pressure reducing valve, as and for the purpose set forth.

In testimony whereof we have hereunto set our hands in presence of subscribing witnesses

CHARLES HENRY THOMAS ALSTON.
PERCIVAL TURNER HOUSTON.

Witnesses as to the signature of Charles Henry Thomas Alston:
W. J. NORWOOD,
GEO. B. FRAKLIN.

Witnesses as to the signature of Percival Turner Houston:
B. G. HARRISON,
GEORGE C. DOWNING.

---

Copies of this patent may be obtained for five cents each, by addressing the "Commissioner of Patents, Washington, D. C."